United States Patent
Lucas

(10) Patent No.: US 6,590,560 B1
(45) Date of Patent: Jul. 8, 2003

(54) SYNCHRONIZED COCKPIT LIQUID CRYSTAL DISPLAY LIGHTING SYSTEM

(75) Inventor: John L. Lucas, Springville, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 09/511,393

(22) Filed: Feb. 23, 2000

(51) Int. Cl.[7] ................................................ G09G 3/36
(52) U.S. Cl. ................ 345/102; 345/213; 250/214 AG
(58) Field of Search .......................... 362/23, 318, 471, 362/540, 543, 545; 345/93–94, 102, 213

(56) References Cited

U.S. PATENT DOCUMENTS

| | | | | |
|---|---|---|---|---|
| 5,159,445 A | * | 10/1992 | Gitlin et al. .................. | 358/88 |
| 5,440,324 A | * | 8/1995 | Strickling, III et al. ..... | 345/102 |
| 5,943,174 A | * | 8/1999 | Bryant et al. ................ | 359/809 |
| 6,088,165 A | * | 7/2000 | Janeczko et al. ........... | 359/629 |
| 6,119,023 A | * | 9/2000 | Tomiyori ..................... | 455/574 |

* cited by examiner

Primary Examiner—Kent Chang
Assistant Examiner—Ralph L. Taylor
(74) Attorney, Agent, or Firm—Nathan O. Jensen; Kyle Eppele

(57) ABSTRACT

A synchronized cockpit liquid crystal display (LCD) lighting system includes a backlight of the LCD, a power source to drive the backlight, a night-vision device having an adjustable gain, and a synchronization signal source. The synchronization signal source controls both the gain of the night-vision device and the power source. The synchronization signal causes the power source to drive the backlight. While the backlight is being driven, the gain of the goggles is decreased. A method of enhancing night-vision in a cockpit having at least one LCD comprises decreasing the gain of a night-vision device when the backlight is being driven by a power source. If there are multiple LCDs, their backlights are all driven at the same time. Decreasing the gain makes the ambient light from the LCDs invisible to the night-vision device.

25 Claims, 2 Drawing Sheets

SYNCHRONIZED COCKPIT LIQUID CRYSTAL DISPLAY LIGHTING SYSTEM

BACKGROUND OF THE INVENTION

1. Field of the Invention

The present invention relates to a method and apparatus for enhancing night vision. More specifically the present invention relates to the use of a synchronization signal to adjust the gain on night-vision devices when the backlights of liquid crystal displays (LCDs) are being driven.

2. Problems in the Art

Airplane cockpits utilize LCDs to convey information to a pilot. Military pilots utilize night-vision goggles when flying their aircraft at night. The night-vision goggles allow the pilot to see things that he would not normally be able to see. Night-vision goggles greatly aid a pilot in finding targets at night.

Night-vision goggles operate by amplifying light. The gain or amplification of the goggles automatically varies with the amount of ambient light in the cockpit. In order to allow a pilot to receive maximum benefits from the goggles, it would be desirable to operate the goggles at maximum gain. However, because of the ambient light within the cockpit, which is primarily due to the light from the LCDs' backlights, it is not possible to operate the goggles at a maximum gain. A decrease in the gain of the night-vision goggles makes objects outside of the cockpit more difficult to see. There is a need in the art for a device which minimizes the ambient light sensed by the goggles, allowing the goggles to operate at a higher gain for a longer time period. Such a device is disclosed by the present invention.

Currently optical filters are used to reduce the ambient light in the cockpit. The optical filters are placed on the LCD's screen. These filters typically function by blocking out the frequency at which the night-vision goggles amplify. However, the spectrum at which night-vision goggles amplify is widening. Rather than having to cascade more filters or create more sophisticated filters, ambient light from LCDs can be nullified by synchronizing the backlights of LCDs with each other and with the gain on night-vision goggles. Optical filters would still be used to prevent light from leaving the cockpit, preventing other planes or people on the ground from seeing the cockpit light.

FEATURES OF THE INVENTION

A primary feature of the present invention is a device and method that allows night-vision devices to operate at maximum gain for a greater period of time than previously allowed in the prior art.

Another feature of the present invention is the provision of a method and device which synchronizes LCD backlights with each other and with the gain on night-vision devices.

Another feature of the present invention is a method and device which effectively makes ambient light from LCD backlights "invisible" to night-vision devices.

Another feature of the present invention is a method and device which makes ambient light from light emitting diodes (LEDs) on the control panel "invisible" to night-vision devices.

Another feature of the present invention is a method and device which makes it easier for pilots to find targets at night.

These, as well as other features of the invention, will be apparent from the following description in conjunction with the accompanying drawings.

SUMMARY OF THE INVENTION

A method for enhancing the operation of a night-vision device involves synchronizing LCD backlights with each other and with the gain on the night vision device. A power source drives the backlights. When the backlights are being driven, the gain on the night vision device is reduced. Reducing the gain when the backlights are being driven eliminates most of the ambient light sensed by the night-vision device.

An apparatus for enhancing night-vision includes a night-vision device having a variable gain control, at least one LCD having a backlight, a power source to drive the backlight, and a synchronization signal source. The synchronization signal source is operatively connected to the power source and the variable gain control of the night-vision device. The synchronization signal controls driving of the backlight of the LCD. The synchronization signal also controls the gain of the night-vision device. When the synchronization signal causes the power source to drive the backlight, it also causes the gain of the night-vision device to decrease.

DETAILED DESCRIPTION OF AN EXEMPLARY EMBODIMENT

The present invention will be described as it applies to an exemplary embodiment. It is not intended that the present invention be limited to the described embodiments. It is intended that the invention cover all alternatives, modifications, and equivalents which may be included within the spirit and scope of the invention.

Figure 1:
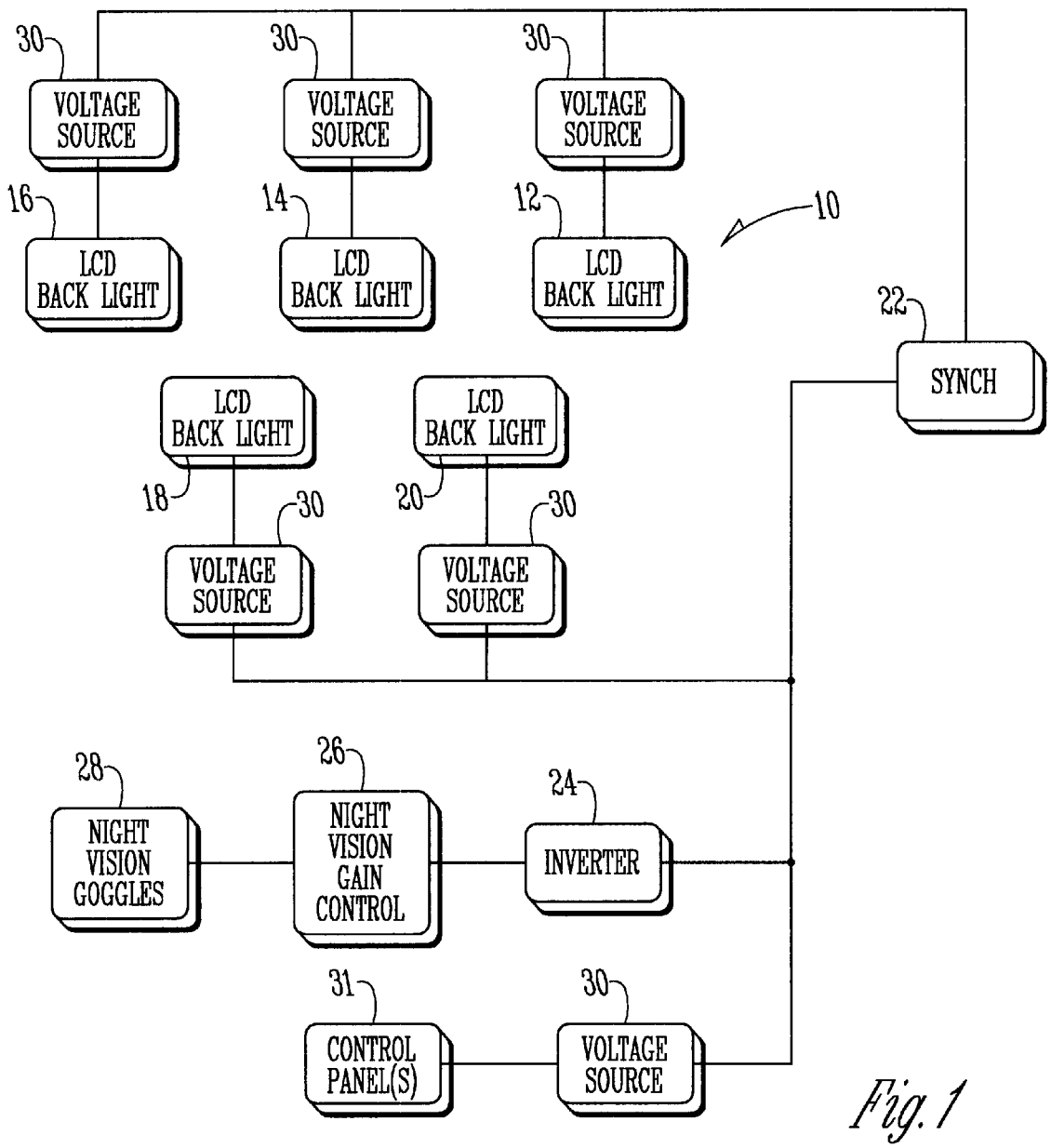
FIG. 1 is a block diagram of an apparatus according to the present invention.

A block diagram of an apparatus in accordance with the present invention is shown in FIG. 1. The apparatus for synchronizing the LCDs with the gain of the night-vision goggles is generally referenced by the numeral 10. Within an airplane cockpit there are a number of LCD backlights 12, 14, 16, 18, 20. The LCDs are used to display different types of flight information such as airplane altitude, velocity, directional headings, etc. A synchronization signal source 22 is electrically coupled to voltage sources 30. The voltage sources 30 drive the LCD backlights 12, 14, 16, 18, 20 and LEDs on the control panel(s) 31. The synchronization signal source 22 is also connected to an inverter 24, which is connected to the night-vision gain control 26.

The gain 50 (see FIG. 2) on the night-vision goggles 28 is responsive to ambient light within the cockpit. The gain 50 continually adjusts based on the amount of ambient light in the cockpit. As the ambient light in the cockpit increases, the gain 50 on the night-vision goggles 28 automatically decreases in response to the increased light. As the gain 50 on the goggles 28 decreases, there is less clarity and resolution on outside objects, such as other planes or bombing targets. By reducing ambient light to a minimum, night-vision goggles 28 can be operated at a higher gain 50 for a longer period of time. Other night vision devices, such as a night scope, could be used instead of night-vision goggles.

In FIG. 1, the synch signal source 22 functions as a logic device. When the synch signal source 22 sends out a logical 1, the voltage sources 30 send high voltage pulses 40 to the fluorescent LCD backlights 12, 14, 16, 18, 20 and to the LEDs on the control panels(s) 31. The voltage sources 30 drive the LCD backlights 12, 14, 16, 18, 20 and the LEDs. Rather than using a voltage source, a current source could be used. The current source would pulse current to the backlights in a similar manner to the voltage pulses from the voltage source. The voltage sources 30 or current sources function as a power source for the LCD backlights 12, 14, 16, 18, 20 and the LEDs. When the synch signal source 22 sends out a logical 1, the logical 1 is inverted by the inverter 24. The inverter sends a logical 0 to the night vision gain control 26, causing the night-vision gain to drop to a minimum value 48 (see FIG. 2). The night-vision gain control 26 reduces the gain 50 of the night-vision goggles 28.

The synchronization signal only stays at a logical 1 for a period of 3–50 microseconds. The voltage pulse 40 that drives the LCD backlights 12, 14, 16. 18, 20 has a duration 46 of 3–50 microseconds. As can best be seen in FIG. 2, the gain 50 of the goggles 28 drops to a minimum value 48 for these 3–50 microseconds. The gain 50 of the night-vision goggles 28 stays low 48 for a few microseconds after the voltage pulse 40 has been removed to allow the phosphors of the fluorescent backlights to decay. However, because the phosphors decay almost immediately, this brief time period is negligible and the only time that light is emitted from the fluorescent backlights is during the high voltage pulse 40. LEDs also decay almost instantaneously, so the LEDs only emit light when they are being pulsed.

Figure 2:
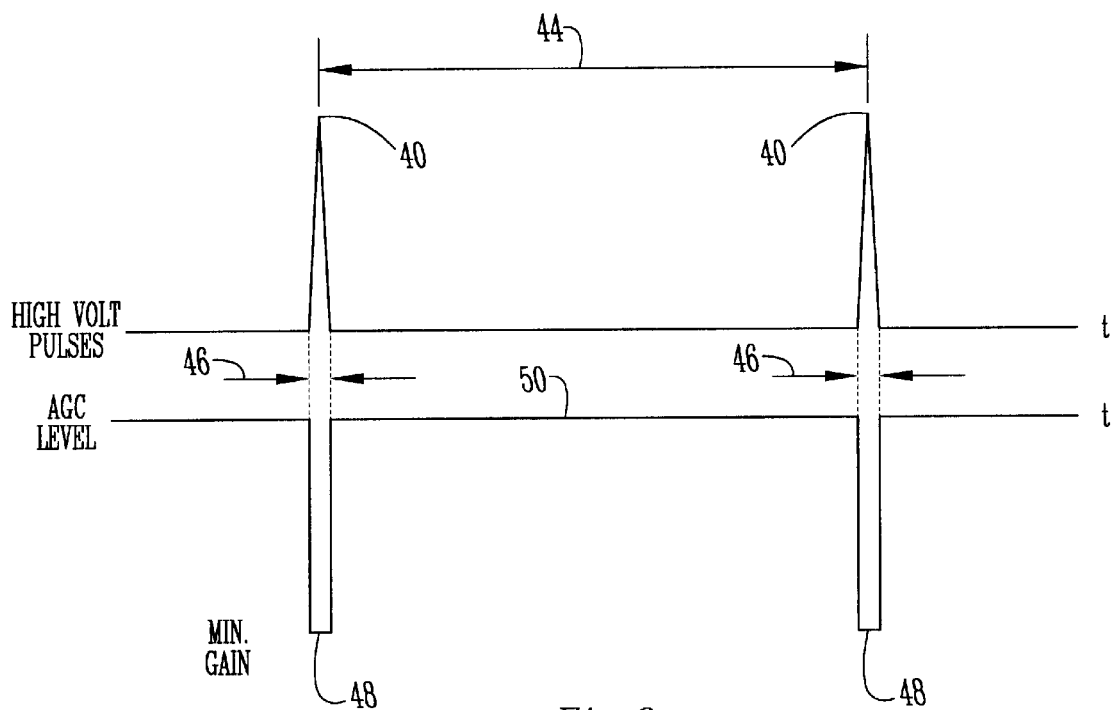
FIG. 2 is a timing diagram showing the decrease in the gain of the night-vision goggles during the time when the backlight drivers of the LCDs are being pulsed.

In FIG. 2, a single voltage pulse 40 is shown. It is understood that a series of pulses could be used instead. In that case, the series of pulses would have a duration of 3–50 microseconds, the same total duration as a single pulse.

In essence, the light from the LCD backlights and the LEDs is invisible to the night-vision goggles. The human eye does not respond fast enough to see this shutting down of the gain, due to physiological limitations of the eye. The time interval that the gain is reduced is too brief to be detected. Therefore, a pilot flying a plane utilizing the invention would not notice the reduced gain during the synchronized pulses of the LCDs. The time 44 between high voltage pulses 40 is 16.67 milliseconds or less, corresponding to a pulse frequency of 60 Hertz or greater. If a series of pulses were used instead of a single pulse, the time between the last pulse of one series and the first pulse of the next series would be 16.67 milliseconds or less. A frequency of less than 60 Hertz might cause the pilot to detect flicker on the LCDs or the LEDs. It should be noted that a pilot does not look at LCDs through the goggles. Rather, a pilot looks at the LCDs underneath the goggles.

Rather than electrically reducing the gain, mechanical means could be utilized to "blind" the goggles when the LCD backlights 12, 14, 16, 18, 20 are pulsed. For example, a shutter could cover the goggles during the time the LCD backlights 12, 14, 16, 18, 20 are pulsed. Once again, the shutter would not be visible because it is too fast for the human eye to see.

Although the invention has been described with reference to LCDs within a cockpit, it is not intended that the invention be limited to a cockpit. There are other conceivable situations where a night-vision device would be utilized where an LCD is also being used. For example, it is conceivable that car drivers may one day use night-vision goggles. It might be desirable to synchronize any LCDs in the car with the gain on the night-vision goggles. It is intended that the present invention would apply in that context as well.

From the foregoing, it can be seen that the invention possesses at least all of the stated features.

I claim:

1. A method of enhancing night-vision in a cockpit having a liquid crystal display (LCD), the method comprising:
   providing a night-vision device having an adjustable gain;
   synchronizing a power source used to drive a backlight of the LCD with the gain on the night-vision device.

2. The method of claim 1 wherein the step of synchronizing a power source comprises:
   pulsing a voltage source to drive the backlight for a pre-determined timed interval and reducing the gain of the night-vision device for the pre-determined time interval.

3. The method of claim 1 wherein the night-vision device is night-vision goggles.

4. The method of claim 2 wherein the pre-determined time interval of the voltage pulse is 50 microseconds or less.

5. The method of claim 2 wherein the voltage is pulsed at a frequency of at least 60 Hertz.

6. The method of claim 1 wherein the step of synchronizing the power source comprises:
   communicating a synchronization signal to the power source and the adjustable gain control, the power source sending a voltage pulse to the backlight of the LCD while receiving the synchronization signal, the gain of the night-vision device being reduced to a minimum value while the adjustable gain control is receiving the synchronization signal.

7. The method of claim 1 wherein the cockpit includes a plurality of LCDs with a plurality of backlights and a voltage source for each backlight, the method further comprising:
   synchronizing all the backlights of the LCDs with the gain on the night-vision device;
   pulsing a voltage to drive the backlights of the plurality of LCDs for a pre-determined timed interval; and
   reducing the gain of the night-vision device for the pre-determined time interval.

8. The method of claim 1 wherein the power source is a voltage source.

9. The method of claim 1 wherein the power source is a current source.

10. The method of claim 1 wherein the cockpit also has a control panel with a light emitting diode (LED), the method further comprising:
    synchronizing a power source used to to drive the LED with the gain on the night-vision device.

11. The method of claim 7 wherein the cockpit also has a control panel with a plurality of light emitting diodes (LEDs), each LED having a voltage source, the method further comprising:
    synchronizing all of the LEDs with the gain on the night-vision device; and
    pulsing a voltage to drive the plurality of LEDs for the pre-determined time interval.

12. The method of claim 11 wherein the pre-determined time interval is 50 microseconds or less.

13. The method of claim 4 wherein the voltage pulse is a series of pulses, the series of pulses having a total duration of 50 microseconds or less.

14. The method of claim 13 wherein the series of pulses has a frequency of at least 60 Hertz.

15. An apparatus to improve night-vision in a cockpit having a liquid crystal display (LCD) with a backlight, and a power source operatively coupled to the backlight, the apparatus comprising:

a night-vision device having an adjustable gain control;

a synchronization signal source operatively connected to the power source to control the power source, and to the gain control of the night-vision device, to synchronize the backlighting and the gain control.

16. The apparatus of claim 15 wherein the power source is a voltage source.

17. The apparatus of claim 15 wherein the power source is a current source.

18. The apparatus of claim 15 wherein the night-vision device is night-vision goggles.

19. The apparatus of claim 15 wherein the cockpit has a plurality of LCDs, with each LCD having a backlight, and the synchronization signal source being operatively connected to each LCD to synchronize the backlights for the LCDs.

20. The apparatus of claim 19 wherein the cockpit has a plurality of light emitting diodes (LEDs), each LED having a power source, the apparatus further comprising:

the synchronization signal source being operatively connected to each power source of the LEDs to synchronize the LEDs with the LCD backlights and the gain of the night-vision device.

21. The apparatus of claim 15, further comprising:

an inverter operatively connected to the synchronization signal source and the adjustable gain control.

22. A method of improving night vision using night-vision goggles in an aircraft having a liquid crystal display (LCD) panel, the method comprising:

activating the backlight of the LCD;

automatically decreasing a gain of the goggles when the LCD backlight is activated so as to eliminate sensing of the backlighting by the goggles.

23. The method of claim 22 wherein the LCD panel includes a plurality of backlights for the panel, the method further comprising:

synchronizing power sources of the backlights to simultaneously activate the backlights of the panel for predetermined intervals.

24. The method of claim 23 wherein the interval is 3–50 microseconds.

25. The method of claim 22 wherein the gain decrease is imperceptable to the human eye.

* * * * *